US011399468B2

(12) United States Patent
Kraus (10) Patent No.: US 11,399,468 B2
(45) Date of Patent: Aug. 2, 2022

(54) ROUND BALER CROP DISTRIBUTION SYSTEM

(71) Applicant: DEERE & COMPANY, Moline, IL (US)

(72) Inventor: Timothy J. Kraus, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 545 days.

(21) Appl. No.: 16/451,104

(22) Filed: Jun. 25, 2019

(65) Prior Publication Data

US 2020/0404854 A1 Dec. 31, 2020

(51) Int. Cl.
*A01F 15/10* (2006.01)
*A01F 15/07* (2006.01)
*A01F 15/18* (2006.01)

(52) U.S. Cl.
CPC ............ *A01F 15/106* (2013.01); *A01F 15/07* (2013.01); *A01F 15/18* (2013.01)

(58) Field of Classification Search
CPC ........ A01F 15/106; A01F 15/07; A01F 15/18; A01F 15/0833
See application file for complete search history.

(56) References Cited

U.S. PATENT DOCUMENTS

| | | | | |
|---|---|---|---|---|
| 4,433,533 A * | 2/1984 | Giani | ................. | A01F 15/0833 100/99 |
| 4,686,820 A * | 8/1987 | Andra | ................. | A01F 15/0833 100/88 |
| 7,818,954 B2 * | 10/2010 | Rempe | ................. | A01F 15/106 56/341 |
| 8,443,580 B2 * | 5/2013 | Matousek | ............ | A01D 43/006 56/341 |
| 8,464,508 B2 * | 6/2013 | Matousek | ............ | A01D 43/006 56/341 |

(Continued)

FOREIGN PATENT DOCUMENTS

| | | | |
|---|---|---|---|
| EP | 1685759 A1 * | 8/2006 | ............ A01D 90/12 |
| EP | 2267567 A2 | 12/2010 | |

(Continued)

OTHER PUBLICATIONS

European Search Report issued in counterpart application No. 20181676.6 dated Nov. 16, 2020 (07 pages).

*Primary Examiner* — Arpad Fabian-Kovacs (57) ABSTRACT

A baler includes a housing forming a baling chamber. The baling chamber includes an inlet defining an inlet width. The inlet width extends substantially across the baling chamber, between a first lateral side and a second lateral side. A crop distributor defines a distributor width and includes a forward end and a rearward end. The distributor width is substantially less than the inlet width. One of the baling chamber and the crop distributor is moveable relative to the other of the baling chamber and the crop distributor, such that the rearward end of the crop distributor is laterally moveable, relative to the inlet of the baling chamber, between the first lateral side and the second lateral side. Lateral movement of the rearward end of the crop distributor relative to the baling chamber distributes the cut crop material across the inlet width of the baling chamber.

12 Claims, 4 Drawing Sheets

(56) References Cited

U.S. PATENT DOCUMENTS

| | | | |
|---|---|---|---|
| 8,490,375 B2* | 7/2013 | Kendrick | A01D 43/06 |
| | | | 56/341 |
| 8,627,765 B2* | 1/2014 | Reijersen Van Buuren | |
| | | | A01F 15/0705 |
| | | | 100/40 |
| 8,833,049 B2* | 9/2014 | Matousek | A01D 41/1243 |
| | | | 56/341 |
| 9,877,432 B2* | 1/2018 | Smith | A01F 15/0705 |
| 9,949,438 B2* | 4/2018 | Smith | A01F 15/0705 |
| 11,160,213 B2* | 11/2021 | Kraus | A01F 15/106 |
| 2008/0271428 A1 | 11/2008 | Rempe et al. | |
| 2018/0325024 A1* | 11/2018 | Rotole | A01D 34/43 |
| 2020/0000040 A1* | 1/2020 | Bruns | A01F 15/0705 |

FOREIGN PATENT DOCUMENTS

| | | | | |
|---|---|---|---|---|
| EP | 2556742 A1 | 2/2013 | | |
| WO | WO-2007031093 A1 * | 3/2007 | | A01F 15/08 |
| WO | WO-2019130139 A1 * | 7/2019 | | A01F 15/106 |

* cited by examiner

ROUND BALER CROP DISTRIBUTION SYSTEM

TECHNICAL FIELD

The disclosure generally relates to a baler, and more particularly to a round baler.

BACKGROUND

Balers are used to gather a cut crop material and form the crop material into a bale that is tightly bound together. Balers include a housing the forms a baling chamber, within which the bale is formed. Some balers, e.g., small square balers and large square balers, form the bale into a rectangular shape, while other balers, e.g., round balers, form the bale into a round or cylindrical shape.

Traditionally, the size of round bales has been limited to a width or height of approximately four or five feet, with a diameter ranging between three and six feet. Accordingly, the largest traditional round bale has a bale diameter of approximately six feet, and a bale width of approximately five feet. Although this bale size has met customer needs, the size of farms and bale handling equipment has grown, and a larger bale size is desired in an effort to reduce the number of bales that need to be handled.

If the bale diameter is increased without increasing the bale width, the resultant bale is tall and narrow, would be unstable, and would tend to fall over on its side once deposited on the ground. Accordingly, in order to increase the bale size, it is necessary to increase both the bale diameter and the bale width proportionally, so that the resultant round bale is stable.

Traditionally, the baler harvests cut crop material that has been formed into a windrow or swath. A tractor straddles the windrow as the crop material is harvested. In order to evenly fill the baling chamber across the width of the baler, the tractor may need to weave left and right. However, if the width of the baling chamber increases to eight feet or more, then the tractor may drive over and compact the crop material as it weaves left and right to evenly fill the baling chamber.

SUMMARY

A baler for forming cut crop material into a bale is provided. The baler includes a housing forming a baling chamber. The baling chamber includes an inlet defining an inlet width, and having a first lateral side and a second lateral side disposed on opposing ends of the inlet width. The inlet width extends substantially across the baling chamber, between the first lateral side and the second lateral side. A crop distributor includes a forward end and a rearward end. The forward end of the crop distributor is operable to receive the cut crop material. The rearward end of the crop distributor is operable to dispense the cut crop material into the inlet of the baling chamber. One of the baling chamber and the crop distributor is moveable relative to the other of the baling chamber and the crop distributor, such that the rearward end of the crop distributor is laterally moveable, relative to the inlet of the baling chamber, between the first lateral side and the second lateral side. Lateral movement of the rearward end of the crop distributor relative to the baling chamber distributes the cut crop material across the inlet width of the baling chamber.

In one aspect of the disclosure, the crop distributor includes a distributor width that is less than the inlet width. The inlet width and the distributor width are measured on a substantially horizontal plane, transverse and generally perpendicular to a longitudinal axis of the baler. The longitudinal axis of the baler extends parallel with a primary direction of travel of the baler. In one example embodiment, the distributor width is less than approximately seventy five percent of the inlet width. In another example embodiment, the distributor width is less than approximately fifty percent of the inlet width. In another example embodiment, the distributor width is less than approximately twenty five percent of the inlet width.

In one aspect of the disclosure, the baler includes a pickup head that is coupled to the forward end of the crop distributor. The pickup head is operable to lift the cut crop material from a ground surface and convey the cut crop material to the forward end of the crop distributor. The pickup head includes a pickup width. The pickup width is measured on the substantially horizontal plane, transverse and generally perpendicular to the longitudinal axis of the baler. The pickup width is less than the inlet width. In one example embodiment, the pickup width is less than approximately seventy five percent of the inlet width. In another example, the pickup width is less than approximately fifty percent of the inlet width.

In one aspect of the disclosure, the pickup width is equal to or greater than the distributor width, i.e., the distributor width is less than the pickup width. In one example, the distributor width is less than seventy five percent of the pickup width. In another example, the distributor width is less than fifty percent of the pickup width.

In one example embodiment, the crop distributor is moveable relative to the baling chamber. The baler includes an actuator that is coupled to the crop distributor. The actuator is operable to move the crop distributor relative to the baling chamber. The crop distributor is rotatable about a pivot axis, such that the rearward end of the crop distributor moves laterally along an arcuate path between the first lateral side and the second lateral side along of the inlet. The pivot axis is disposed adjacent the forward end of the crop distributor and is arranged in a substantially vertical orientation, such that the arcuate path is disposed on the substantially horizontal plane.

In one aspect of the disclosure, the crop distributor includes a conveyor. The conveyor includes an endless loop rotatable about a pair of drums in an endless cycle. The conveyor extends between the forward end and the rearward end of the crop distributor to move the crop material therebetween.

In one aspect of the disclosure, the baler includes a left-side sensor and a right-side sensor. The left-side sensor is operable to sense a size of the bale being formed within the baling chamber adjacent to the first lateral side of the inlet. The right-side sensor is operable to sense a size the bale being formed within the baling chamber adjacent to the second lateral side of the inlet. A computing device is disposed in communication with the left-side sensor and the right-side sensor. The computing device is operable to receive data from the left-side sensor related to the size of the bale adjacent to the first lateral side, and data from the right-side sensor related to the size of the bale adjacent to the second lateral side. The computing device is controllably coupled to the actuator and operable to control the actuator to move between the first lateral side and the second lateral side in response to the data received from the left-side sensor and the right-side sensor related to the size of the bale adjacent to the first lateral side and the second lateral side respectively. Accordingly, the computing device controls the movement of the crop distributor to evenly distribute the cop material across the inlet width to maintain an approximately even bale size between the first lateral side and the right later side of the baling chamber.

Accordingly, the lateral movement of the rearward end of the crop distributor relative to the baling chamber evenly distributes the cut crop material across the inlet width of the baling chamber. This enables the size of the baling chamber and the inlet width thereof to be increased without the need to increase the width of the pickup head. Accordingly, the size of the bale chamber may be increased to form a bale having a bale width of eight feet or more without having to increase the width of the pickup head a corresponding amount, and without the need for the tractor to weave left and right across the crop windrow to evenly fill the bale chamber.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "substantially" or "approximately" are understood by those of ordinary skill to refer to reasonable ranges outside of the given value, for example, general tolerances associated with manufacturing, assembly, and use of the described embodiments.

Figure 4:
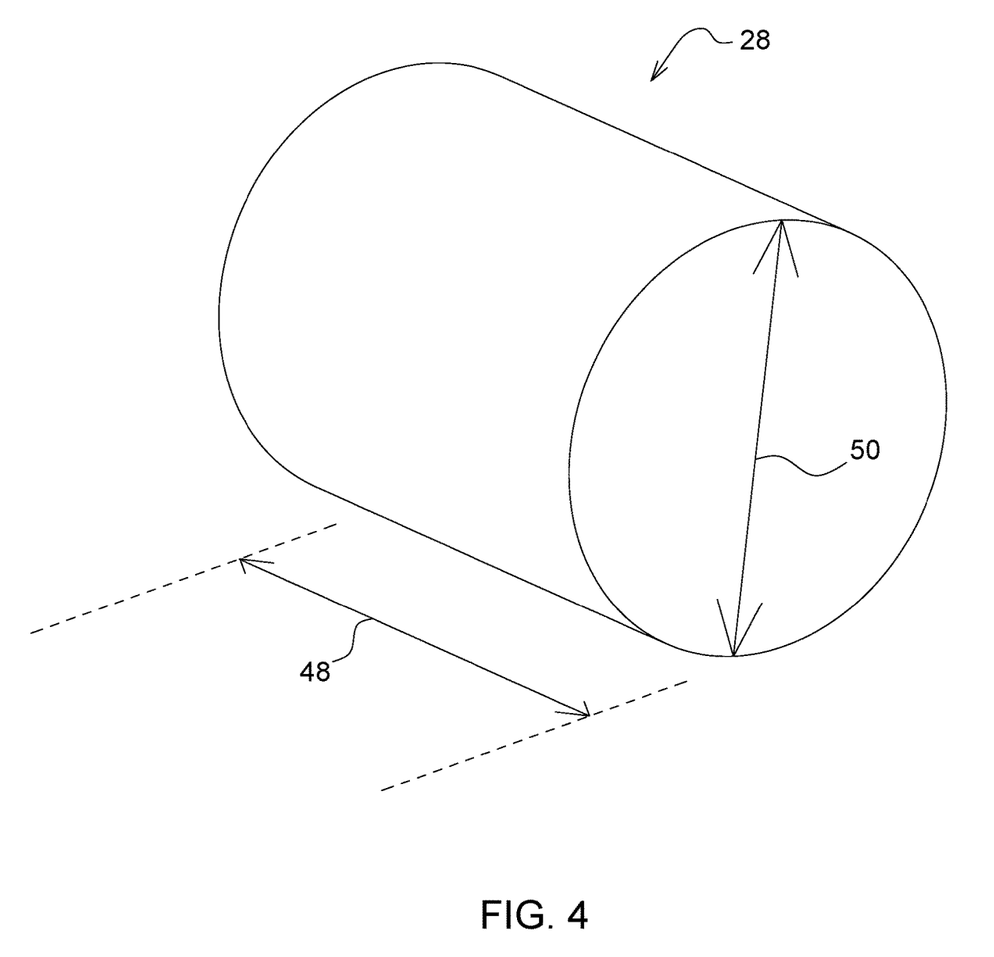
FIG. 4 is a schematic perspective view of a round bale.

Referring to the Figures, wherein like numerals indicate like parts throughout the several views, a baler is generally shown at 20. The baler 20, generally shown in FIG. 1, forms cut crop material 22 into a bale 28, generally shown in FIG. 2. On some embodiments, the baler 20 may be embodied as a drawn baler 20, which is drawn or pulled by a vehicle, e.g., an agricultural tractor. In other embodiments, the baler 20 may be embodied as a self-propelled baler, having a prime mover, a steering system, etc. Additionally, the Figures and the detailed description describe the baler 20 as a round baler 20 operable to form a round bale 28, such as shown in FIG. 4. However, it should be appreciated that the teachings of this disclosure may be applied to a baler 20 operable to form a rectangular bale, e.g., a large square baler.

Figure 1:
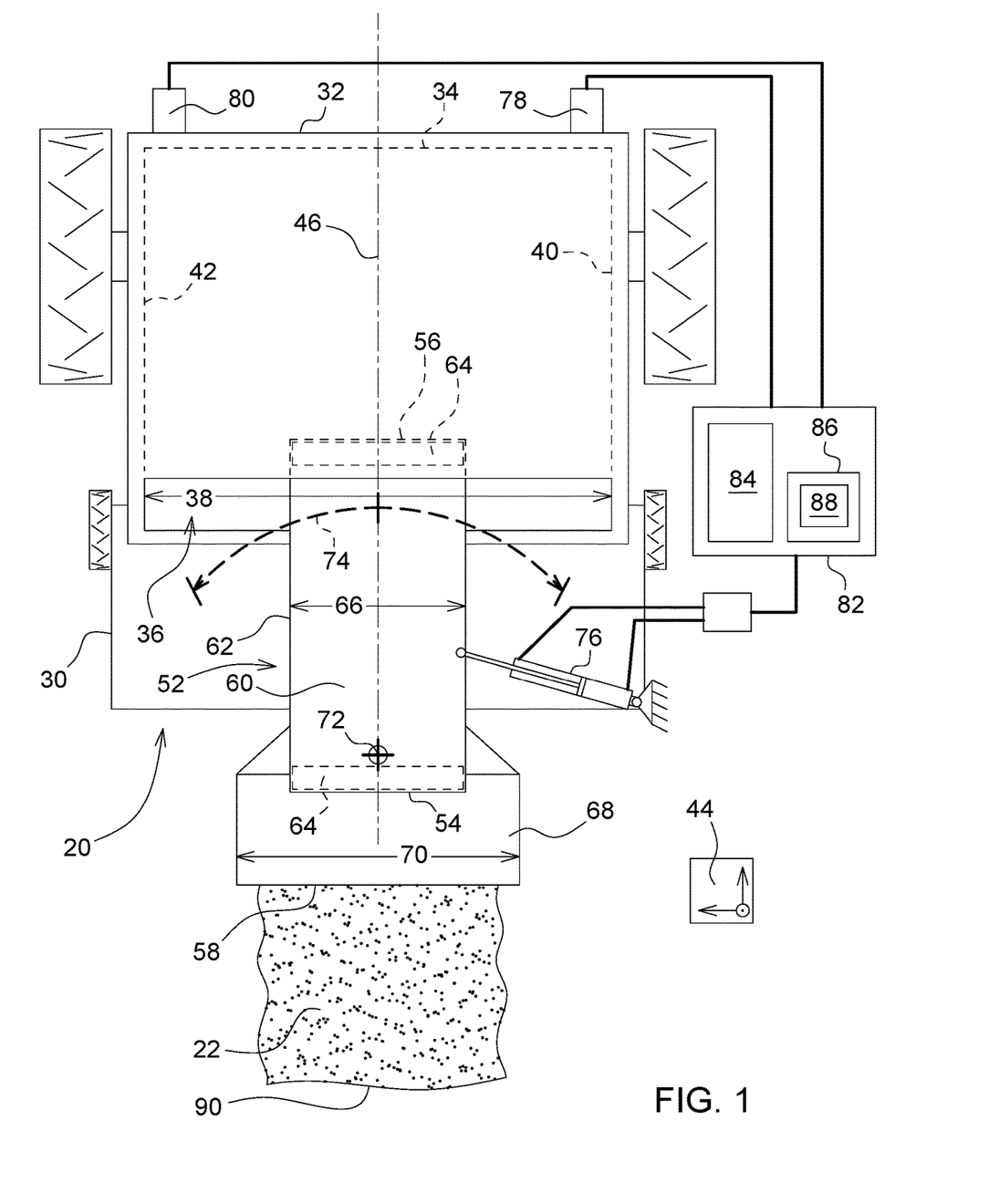
FIG. 1 is a schematic top plan view of a baler showing a crop distributor centrally located within an inlet of a baling chamber.

Referring to FIG. 1, the baler 20 includes a frame 30, which supports a housing 32 forming a baling chamber 34. The housing 32 is attached to and supported by the frame 30. The baling chamber 34 includes an inlet 36, through which the crop material 22 is supplied or input into the baling chamber 34. The baling chamber 34 is configured to form the crop material 22 into the bale 28. The baler 20 may include any system and/or configuration of components that are capable of forming the crop material 22 into the bale 28. For example, the baler 20 may include, but is not limited to, a variable size bale formation system or a fixed size bale formation system, such as known to those skilled in the art. The specific features, components, and processes used to form the bale 28 within the baling chamber 34 are known to those skilled in the art, are not pertinent to the teachings of this disclosure, and are therefore not described in detail herein.

The inlet 36 defines an inlet width 38. The inlet width 38 extends substantially across the baling chamber 34 and includes a first lateral side 40 and a second lateral side 42. The first lateral side 40 and the second lateral side 42 are disposed on opposing ends or sides of the inlet 36 and cooperate to define the inlet width 38 therebetween. The first lateral side 40 may be considered a left lateral side, whereas the second lateral side 42 may be considered a right lateral side. The inlet width 38 is measured on a substantially horizontal plane 44, transverse and generally perpendicular to a longitudinal axis 46 of the baler 20. The longitudinal axis 46 of the baler 20 extends parallel with a primary direction of travel of the baler 20 and is centrally located and extends along a longitudinal length of the baler 20. The inlet width 38 approximately corresponds to a desired width of the bale 28 to be formed within the baling chamber 34. For example, referring to FIG. 2, if the baling chamber 34 is sized to form a bale 28 having a bale width 48 approximately equal to eight feet (8'), then the inlet width 38 is also approximately equal to eight feet. It should be appreciated that the bailing chamber is configured to form the bale 28 to include a bale diameter 50 that is proportionally sized to the bale width 48.

Referring to FIG. 1, the baler 20 further includes a crop distributor 52. The crop distributor 52 includes a forward end 54 and a rearward end 56. The forward end 54 of the crop distributor 52 is disposed nearer a front 58 of the baler 20 than the rearward end 56 of the crop distributor 52, relative to the direction of travel of the baler 20. The forward end 54 of the crop distributor 52 is operable to receive the cut crop material 22. The rearward end 56 of the crop distributor 52 is operable to dispense or feed the cut crop material 22 into the inlet 36 of the baling chamber 34. As such, the rearward end 56 of the crop distributor 52 is disposed adjacent the inlet 36 of the baling chamber 34.

The crop distributor 52 includes a conveyor 60. The conveyor 60 is operable to move the crop material 22 from the forward end 54 of the crop distributor 52 to the rearward end 56 of the crop distributor 52. The conveyor 60 may include any device or system capable of moving the crop material 22 from the forward end 54 to the rearward end 56 of the crop distributor 52. In one example embodiment, the conveyor 60 includes an endless loop 62 mounted on and around two or more drums 64. The endless loop 62 moves in an endless cycle around the two or more drums 64, between the forward end 54 and the rearward end 56. The endless loop 62 may include, but is not limited to, a belt, chain, or other similar device. It should be appreciated that the conveyor 60 may be embodied differently than the endless loop 62 described herein and shown in the Figures.

For example, in another embodiment, the conveyor 60 may include one or more augers or other similar devices capable of moving the crop material 22.

The crop distributor 52 includes a distributor width 66. The distributor width 66 is measured on the substantially horizontal plane 44, transverse and generally perpendicular to the longitudinal axis 46 of the baler 20. The distributor width 66 is the width of the portion of the crop distributor 52 that is used to move the crop material 22. For example, in the embodiment shown in the Figures and described herein, the distributor width 66 is approximately equal to the width of the endless loop 62. However, it should be appreciated that other embodiments of the crop distributor 52 may define the distributor width 66 differently than the example embodiment described herein.

The distributor width 66 is substantially less than the inlet width 38. In one embodiment, the distributor width 66 is less than approximately seventy five percent of the inlet width 38. In another embodiment, the distributor width 66 is less than approximately fifty percent of the inlet width 38. In yet another embodiment, the distributor width 66 is less than approximately twenty five percent of the inlet width 38.

The baler 20 may further include a pickup head 68. As shown in the example embodiment, the pickup head 68 is disposed adjacent to and is coupled to the forward end 54 of the crop distributor 52. The pickup head 68 is operable to lift the cut crop material 22 from a ground surface and convey the cut crop material 22 to the forward end 54 of the crop distributor 52. Once deposited on the forward end 54 of the crop distributor 52, the conveyor 60 of the crop distributor 52 moves the crop material 22 to the rearward end 56 of the crop distributor 52, from which it is fed through the inlet 36 and into the baling chamber 34. The specific features and operation of the pickup head 68 are known to those skilled in the art, are not pertinent to the teachings of this disclosure, and are therefore not described in detail herein.

The pickup head 68 includes or defines a pickup width 70. The pickup width 70 is the width of crop material 22 that the pickup head 68 is capable of lifting off of the ground surface. The pickup width 70 is measured on the horizontal plane 44 transverse and generally perpendicular to the longitudinal axis 46 of the baler 20. The pickup width 70 may be less than the inlet width 38. For example, in one embodiment, the pickup width 70 is less than approximately seventy five percent of the inlet width 38. In another example, the pickup width 70 is less than approximately fifty percent of the inlet width 38.

In contrast, the pickup width 70 is equal to or greater than the distributor width 66, i.e., the distributor width 66 is less than the pickup width 70. For example, in one embodiment, the distributor width 66 may be less than seventy five percent of the pickup width 70. In another example, the distributor width 66 may be less than fifty percent of the pickup width 70.

One of the baling chamber 34 and the crop distributor 52 is moveable relative to the other of the baling chamber 34 and the crop distributor 52, such that the rearward end 56 of the crop distributor 52 is laterally moveable, relative to the inlet 36 of the baling chamber 34, between the first lateral side 40 and the second lateral side 42. The lateral movement of the rearward end 56 of the crop distributor 52 distributes the cut crop material 22 evenly across the inlet width 38 of the baling chamber 34. This enables the baling chamber 34 and the inlet width 38 to be wider than the pickup width 70, while still evenly distributing the crop material 22 across the inlet width 38 of the baling chamber 34. Accordingly, the width of the baling chamber 34 may be increased to form a wider bale 28, without having to increase the size of the pickup head 68 and the pickup width 70 in proportion. For this reason, the same pickup head 68 may be used for a baler 20 that forms a four foot wide bale 28 or a baler 20 that forms an eight foot wide bale 28.

In the example embodiment shown in the Figures and described herein, the crop distributor 52 is moveable relative to the baling chamber 34. However, in other embodiments, it should be appreciated that the relative movement may be reversed, such that the baling chamber 34 moves relative to the crop distributor 52.

In the example embodiment shown in the Figures and described herein, the crop distributor 52 is rotatable about a pivot axis 72. The pivot axis 72 is disposed adjacent the forward end 54 of the crop distributor 52 and is arranged in a substantially vertical orientation, relative to the substantially horizontal plane 44. Because the crop distributor 52 is rotatable about the pivot axis 72 adjacent the forward end 54 of the crop distributor 52, the rearward end 56 of the crop distributor 52 moves laterally along an arcuate path 74 between the first lateral side 40 and the second lateral side 42 along of the inlet 36. The crop distributor 52 may be pivotably mounted to the baler 20 in any suitable manner.

In the example embodiment shown in the Figures and described herein, the baler 20 includes an actuator 76 that is coupled to the crop distributor 52. The actuator 76 is operable to move the crop distributor 52 relative to the baling chamber 34. The actuator 76 may include, for example, a double acting cylinder that interconnects the crop distributor 52 to a fixed location, such as the frame 30 or some other rigid component of the baler 20. The double acting cylinder may include, but is not limited to, a hydraulically driven cylinder, a pneumatically driven cylinder, or an electrically driven cylinder. The double acting cylinder is controlled to extend and retract to move the rearward end 56 of the crop distributor 52 laterally, back and forth across the inlet 36 of the baling chamber 34.

The baler 20 may include a left-side sensor 78 and a right-side sensor 80. The left-side sensor 78 is operable to sense a size of the bale 28 being formed within the baling chamber 34 adjacent to the first lateral side 40 of the inlet 36. The right-side sensor 80 is operable to sense a size the bale 28 being formed within the baling chamber 34 adjacent to the second lateral side 42 of the inlet 36. The left-side sensor 78 and the right-side sensor 80 may sense the size of the bale 28 in any suitable manner. For example, the left-side sensor 78 and the right-side sensor 80 may sense and/or determine a diametric or radial size of the bale 28 being formed in the bailing chamber, a weight of the bale 28 being formed in the bailing chamber, or some other characteristic of the bale 28 that enables size determination between the left-lateral side and the second lateral side 42 of the inlet 36.

A computing device 82 is disposed in communication with the left-side sensor 78 and the right-side sensor 80. The computing device 82 is also disposed in communication with the actuator 76 for controlling movement of the actuator 76. The computing device 82 may alternatively be referred to as a computer, a controller, a module, a control module, a control unit, etc. The computing device 82 is operable to control the operation of the crop distributor 52. The computing device 82 includes a processor 84, a memory 86, and all software, hardware, algorithms, connections, sensors, etc., necessary to manage and control the operation of the crop distributor 52. As such, a method may be embodied as a program or algorithm operable on the computing device 82. It should be appreciated that the computing device 82 may include any device capable of analyzing data from various sensors, comparing data, making the necessary decisions required to control the operation of the crop distributor 52, and executing the required tasks necessary to control the operation of the crop distributor 52.

The computing device 82 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (ND) circuitry, digital-to-analog (D/A) circuitry, and any required input/output (I/O) circuitry, I/O devices, and communication interfaces, as well as signal conditioning and buffer electronics.

The computer-readable memory 86 may include any non-transitory/tangible medium which participates in providing data or computer-readable instructions. The memory 86 may be non-volatile or volatile. Non-volatile media may include, for example, optical or magnetic disks and other persistent memory. Example volatile media may include dynamic random access memory (DRAM), which may constitute a main memory. Other examples of embodiments for memory 86 include a floppy, flexible disk, or hard disk, magnetic tape or other magnetic medium, a CD-ROM, DVD, and/or any other optical medium, as well as other possible memory devices such as flash memory.

The computing device 82 includes the tangible, non-transitory memory 86 on which are recorded computer-executable instructions, including a distribution algorithm 88. The processor 84 of the computing device 82 is configured for executing the distribution algorithm 88. The distribution algorithm 88 implements a method of operating the baler 20.

The computing device 82 receives the sensed data from the left-side sensor 78 related to the size of the bale 28 adjacent to the first lateral side 40, and the sensed data from the right-side sensor 80 related to the size of the bale 28 adjacent to the second lateral side 42. The computing device 82 uses this data to determine the relative size of the bale 28 being formed within the bailing chamber, and thereby, which portion of the inlet 36 between the left-lateral side and the second lateral side 42 of the inlet 36 is the smallest and requires additional crop material 22 to even out the bale 28 size.

The computing device 82 is operable to control the actuator 76 to move between the first lateral side 40 and the second lateral side 42 in response to the data received from the left-side sensor 78 and the right-side sensor 80 related to the size of the bale 28 adjacent to the first lateral side 40 and the second lateral side 42 respectively. The computing device 82 controls the movement of the actuator 76 to maintain an approximately even bale 28 size across the inlet width 38, between the first lateral side 40 and the right later side of the baling chamber 34.

Figure 2:
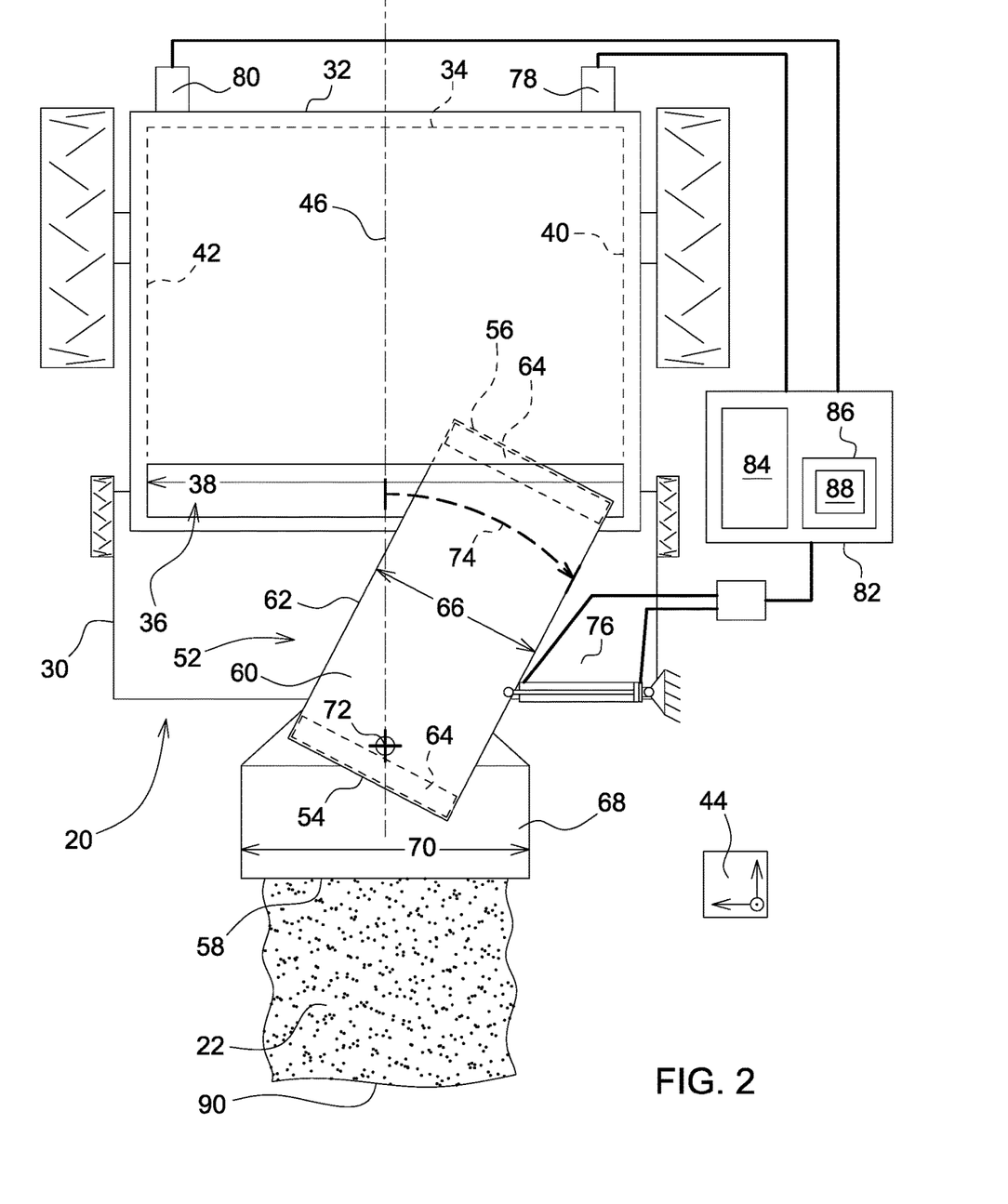
FIG. 2 is a schematic top plan view of the baler showing the crop distributor disposed adjacent a first lateral side of the inlet.
Figure 3:
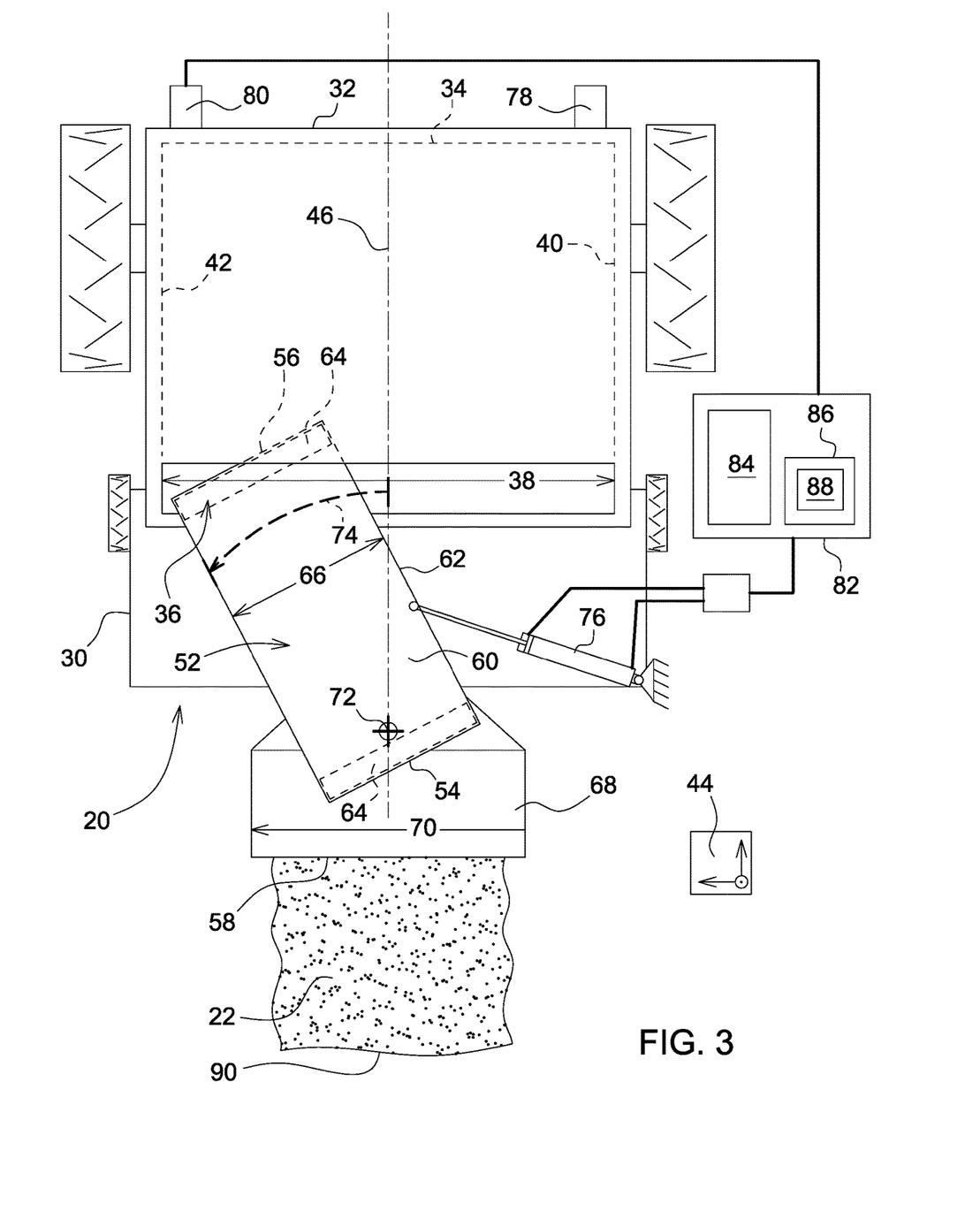
FIG. 3 is a schematic top plan view of the baler showing the crop distributor disposed adjacent a second lateral side of the inlet.

For example, referring to FIG. 2, if the computing device 82 determines that the data from the left-side sensor 78 and the right-side sensor 80 indicate that the left-lateral side of the bale 28 being formed in the bailing chamber is smaller than the right-lateral side of the bale 28, then the computing device 82 may control the actuator 76 to move the crop distributor 52 to the left-lateral side of the inlet 36 to provide additional crop material 22 to the left-lateral side of the inlet 36, until the size of the bale 28 at the left-lateral side of the inlet 36 is approximately even with the size of the bale 28 at the right-lateral side of the inlet 36. After which, referring to FIG. 1, the computing device 82 may control the actuator 76 to move the crop distributor 52 in a consistent and even cycle between the left-lateral side and the right-lateral side of the inlet 36 so that crop material 22 is evenly distributed across the entire inlet width 38 of the bailing chamber. Similarly, referring to FIG. 3, if the computing device 82 determines that the data from the left-side sensor 78 and the right-side sensor 80 indicate that the right-lateral side of the bale 28 being formed in the bailing chamber is smaller than the left-lateral side of the bale 28, then the computing device 82 may control the actuator 76 to move the crop distributor 52 to the right-lateral side of the inlet 36 to provide additional crop material 22 to the right-lateral side of the inlet 36, until the size of the bale 28 at the right-lateral side of the inlet 36 is approximately even with the size of the bale 28 at the left-lateral side of the inlet 36. After which, referring to FIG. 1, the computing device 82 may control the actuator 76 to move the crop distributor 52 in a consistent and even cycle between the left-lateral side and the right-lateral side of the inlet 36 so that crop material 22 is evenly distributed across the entire inlet width 38 of the bailing chamber.

The relative lateral movement between the crop distributor 52 and the bailing chamber enables the crop material 22 to be evenly distributed across the entire inlet width 38 of the bailing chamber, without having to weave the bailer left and right across the windrow 90 to feed the bailing chamber. Additionally, because the crop distributor 52 may evenly feed the crop material 22 into the inlet 36, the inlet width 38 is not limited by the pickup width 70 of the pickup head 68. As such, the bailing chamber and the inlet width 38 may be sized up to provide a round bale 28 having a bale width 48 that is greater than the pickup width 70 of the pickup head 68. These features combine to provide a round baler 20 that may be configured to use standard sized pickup head 68, e.g., approximately four or five feet wide, with a bailing chamber sized to form a bale 28 having a bale width 48 of up to and over eight feet wide, while not having to weave the baler 20 left and right across the windrow 90 of the crop material 22.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A baler for forming cut crop material into a bale, the baler comprising:
   a housing forming a baling chamber having an inlet defining an inlet width, the baling chamber having a first lateral side, a second lateral side, and configured to form the crop material into the bale;
   a pickup head operable to lift the cut crop material from a ground surface;
   a crop distributor including a forward end coupled to the pickup head and operable to receive the cut crop material from the pickup head, the crop distributor including a rearward end operable to dispense the cut crop material into the inlet of the baling chamber;
   wherein the crop distributor includes a distributor width that is less than the inlet width;
   wherein the crop distributor includes a conveyor moveable in an endless loop between the forward end and the rearward end of the crop distributor to convey the crop material from the pickup head to the inlet of the baling chamber; and
   wherein the conveyor is rotatable about a pivot axis, such that the rearward end of the conveyor moves laterally along an arcuate path between the first lateral side and the second altera side along the inlet.

2. The baler set forth in claim 1, wherein the distributor width is less than approximately seventy five percent of the inlet width.

3. The baler set forth in claim 1, wherein the distributor width is less than approximately fifty percent of the inlet width.

4. The baler set forth in claim 1, wherein the distributor width is less than approximately twenty five percent of the inlet width.

5. The baler set forth in claim 1, wherein the pickup head includes a pickup width that is less than the inlet width.

6. The baler set forth in claim 5, wherein the pickup width is equal to or greater than the distributor width.

7. The baler set forth in claim 1, further comprising an actuator coupled to the conveyor and operable to rotate the conveyor about the pivot axis relative to the baling chamber.

8. The baler set forth in claim 1, wherein the pivot axis is disposed adjacent the forward end of the crop distributor and is arranged in a substantially vertical orientation.

9. The baler set forth in claim 1, further comprising a left-side sensor operable to sense a size of the bale being formed within the baling chamber adjacent to the first lateral side, and a right-side sensor operable to sense a size the bale being formed within the baling chamber adjacent to the second lateral side.

10. The baler set forth in claim 9, further comprising a computing device disposed in communication with the left-side sensor and the right-side sensor, and operable to receive data from the left-side sensor related to the size of the bale adjacent to the first lateral side, and data from the right-side sensor related to the size of the bale adjacent to the second lateral side.

11. The baler set forth in claim 10, further comprising an actuator coupled to the crop distributor and operable to move the crop distributor relative to the baling chamber, and wherein the computing device is controllably coupled to the actuator and operable to control the actuator to move between the first lateral side and the second lateral side in response to the data received from the left-side sensor and the right-side sensor related to the size of the bale adjacent to the first lateral side and the second lateral side respectively, to maintain an approximately even bale size between the first lateral side and the right later side of the baling chamber.

12. The baler set forth in claim 1, wherein the conveyor includes an endless loop mounted around two drums to move around the two drums in an endless cycle.

\* \* \* \* \*